(12) United States Patent
Hotta et al.

(10) Patent No.: US 8,801,029 B2
(45) Date of Patent: Aug. 12, 2014

(54) AIRBAG APPARATUS

(71) Applicant: Toyoda Gosei Co., Ltd., Kiyosu (JP)

(72) Inventors: Masashi Hotta, Kiyosu (JP); Yuji Sato, Kiyosu (JP); Kensaku Honda, Kiyosu (JP); Yoshiaki Goto, Kiyosu (JP); Takashi Iida, Kiyosu (JP); Akira Yamashita, Kiyosu (JP); Masaaki Okuhara, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 13/930,062

(22) Filed: Jun. 28, 2013

(65) Prior Publication Data

US 2014/0008903 A1   Jan. 9, 2014

(30) Foreign Application Priority Data

Jul. 6, 2012 (JP) ................................. 2012-152722

(51) Int. Cl.
*B60R 21/26* (2011.01)
*B60R 21/233* (2006.01)

(52) U.S. Cl.
USPC .......................................... 280/729; 280/740

(58) Field of Classification Search
USPC ...................................... 280/729, 730.2, 740
See application file for complete search history.

(56) References Cited

U.S. PATENT DOCUMENTS

| | | | |
|---|---|---|---|
| 7,837,226 B2 | 11/2010 | Honda et al. | |
| 8,356,835 B2 * | 1/2013 | Yamamoto | 280/730.2 |
| 8,528,934 B2 * | 9/2013 | Kobayshi et al. | 280/740 |
| 8,562,015 B2 * | 10/2013 | Yamamoto | 280/729 |
| 8,567,817 B2 * | 10/2013 | Yamamoto | 280/729 |
| 2005/0189742 A1 * | 9/2005 | Kumagai et al. | 280/730.2 |
| 2006/0001244 A1 * | 1/2006 | Taguchi et al. | 280/729 |
| 2006/0175809 A1 * | 8/2006 | Yamaji et al. | 280/729 |
| 2007/0228699 A1 * | 10/2007 | Bederka et al. | 280/730.2 |

FOREIGN PATENT DOCUMENTS

| | | |
|---|---|---|
| JP | 2005-225351 A | 8/2005 |
| JP | 2007-153225 A | 6/2007 |
| JP | 2010-036870 A | 2/2010 |
| JP | 2010-228519 A | 10/2010 |
| JP | 2011-005908 A | 1/2011 |
| JP | 2011-126413 A | 6/2011 |

* cited by examiner

*Primary Examiner* — Drew Brown
(74) *Attorney, Agent, or Firm* — Posz Law Group, PLC

(57) ABSTRACT

An airbag includes a high pressure expansion chamber, a low pressure expansion chamber, and a communication passage, which connects the high pressure expansion chamber and the low pressure expansion chamber to each other. A gas supply port, which supplies inflation gas into the airbag, is located inside the low pressure expansion chamber to discharge the inflation gas toward the inside of the communication passage. The communication passage extends from the edge of a communication port, which connects the high pressure expansion chamber and the low pressure expansion chamber, toward the inside of the high pressure expansion chamber. At deployment and inflation of the airbag, the communication passage is located between a seam formed at the outer periphery of the base fabric sheet of the airbag and the gas supply port.

10 Claims, 6 Drawing Sheets

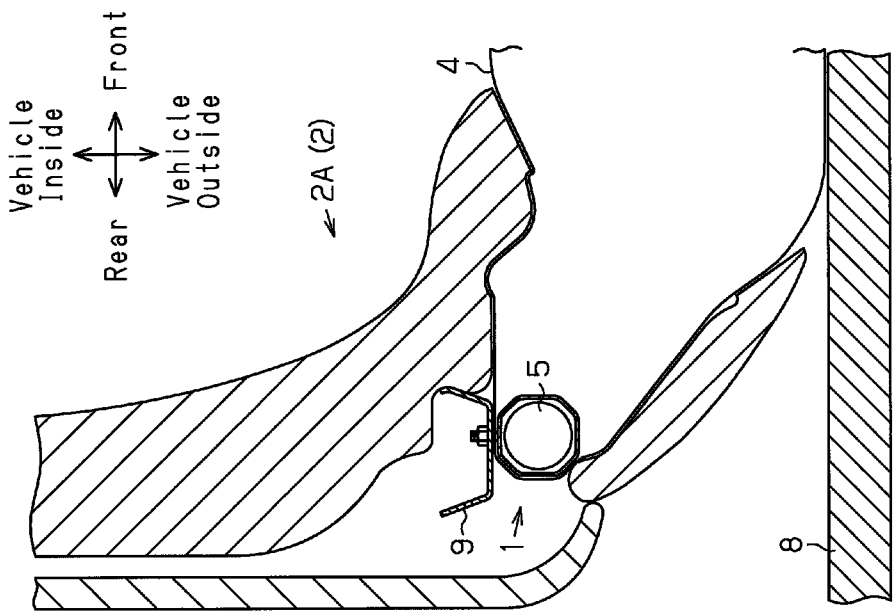
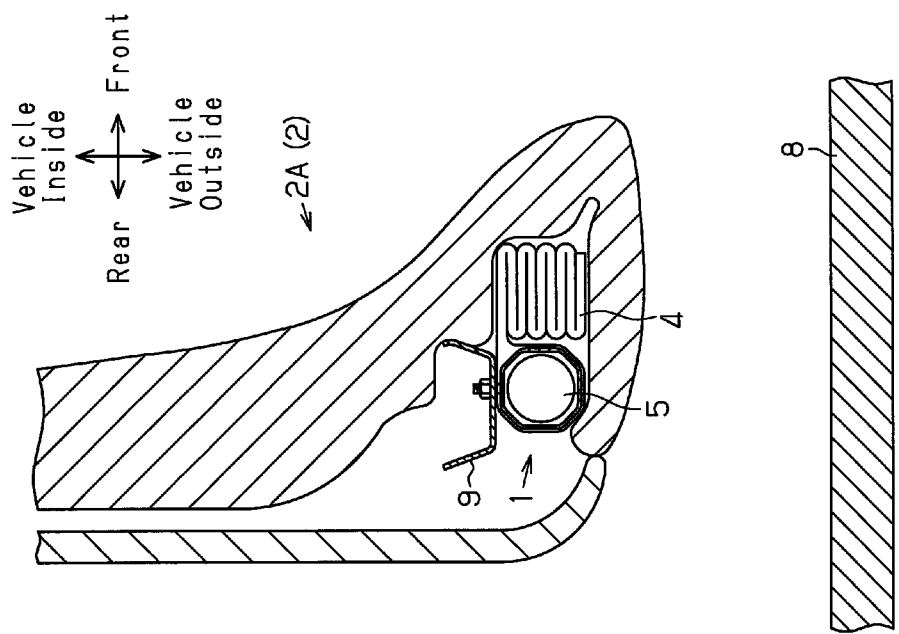

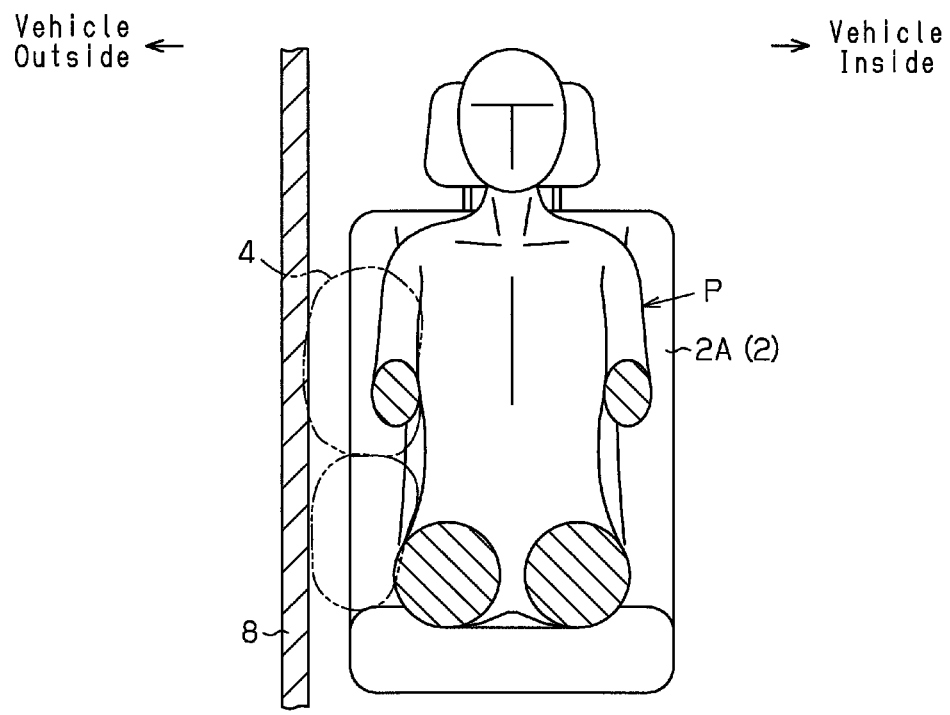
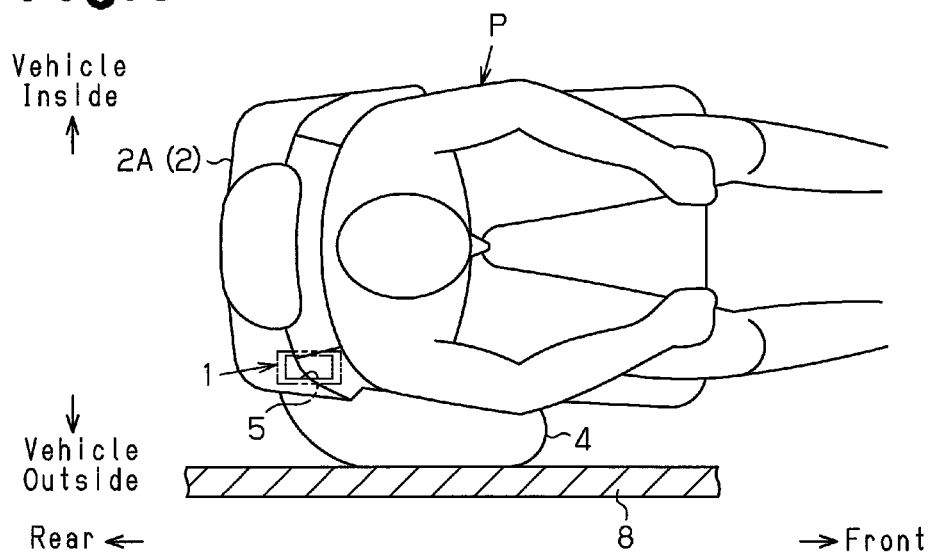

AIRBAG APPARATUS

BACKGROUND OF THE INVENTION

The present invention relates to a vehicle airbag apparatus.

Vehicles such as automobiles are generally provided with an airbag apparatus for protecting an occupant seated in a vehicle seat from an impact of, for example, a vehicle collision. Airbag apparatuses have been proposed that, for example, inflate and deploy an airbag provided in the vehicle seat between an occupant seated in the seat and a body side portion of the vehicle by supplying inflation gas into the airbag.

In such airbag apparatuses, the airbag is partitioned into a plurality of expansion chambers in practical use. For example, in the apparatus disclosed in Japanese Laid-Open Patent Publication No. 2011-126413, the airbag is partitioned into two expansion chambers in a longitudinal direction. When the airbag is deployed and inflated, inflation gas is discharged from a gas supply port of an inflator toward the inside of the expansion chambers.

Typical airbags are formed into a bag shape by joining the periphery of a base fabric sheet that is folded in half or by joining the periphery of two base fabric sheets overlapped with each other by, for example, sewing or adhesion. When the airbag is deployed and inflated, the internal pressure of the airbag acts to separate the joint portion of the base fabric sheet. Thus, the joint portion of the base fabric sheet is required to have high bonding strength.

In the above-mentioned apparatus, when the airbag is deployed and inflated, the inflation gas is discharged toward the inside of the expansion chambers. Thus, the inflation gas reaches and is sprayed to the periphery of the base fabric sheet, that is, the joint portion via the inside of the expansion chambers. Since the inflation gas is highly pressurized, great stress is generated on the joint portion to which the inflation gas is sprayed. Generation of great stress is not preferable in further improving the reliability of the airbag.

SUMMARY OF THE INVENTION

Accordingly, it is an objective of the present invention to provide an airbag apparatus that reduces stress generated at a joint portion of a base fabric sheet when an airbag is deployed and inflated.

To achieve the foregoing objective and in accordance with one aspect of the present invention, an airbag apparatus is provided that includes an airbag, a communication port, a gas supply port, and a communication passage. The airbag has a first expansion chamber and a second expansion chamber. The airbag has a joint portion where an outer periphery of a base fabric sheet is joined. The communication port connects the first expansion chamber and the second expansion chamber to each other in the airbag. The communication port has an edge. The gas supply port is arranged inside the second expansion chamber to discharge inflation gas toward the inside of the communication port. The gas supply port supplies the inflation gas to the inside of the airbag. The communication passage extends from the edge of the communication port, serving as a starting point, toward the inside of the first expansion chamber. At deployment and inflation of the airbag, the communication passage extends across a space between the joint portion of the airbag and the gas supply port.

In the apparatus according to the first aspect, the communication passage, which extends from the communication port, is located between the gas supply port and the joint portion when the airbag is deployed and inflated. Thus, the flow of the inflation gas that is discharged from the gas supply port and flowed into the communication passage collides with the inner wall of the communication passage. The energy of the flow of the inflation gas is reduced due to the collision. As a result, the stress that is generated at the joint portion of the base fabric sheet when the airbag is deployed and inflated is reduced.

BRIEF DESCRIPTION OF THE DRAWINGS

FIG. 2 is a partial cross-sectional plan view illustrating the airbag and an inflator mounted on the backrest of the seat, together with a body side portion;

FIG. 3 is a partial cross-sectional plan view illustrating the state in which the airbag has projected out of the backrest and is inflated and deployed from the state shown in FIG. 2;

FIG. 4 is a front cross-sectional view illustrating the positional relationship between the vehicle seat and the body side portion, together with the occupant and the airbag;

FIG. 5 is a cross-sectional plan view illustrating the positional relationship between the vehicle seat and the body side portion, together with the occupant and the airbag;

DETAILED DESCRIPTION OF THE PREFERRED EMBODIMENTS

A vehicle airbag apparatus 1 according to one embodiment of the present invention will now be described with reference to FIGS. 1 to 8.

Figure 1:
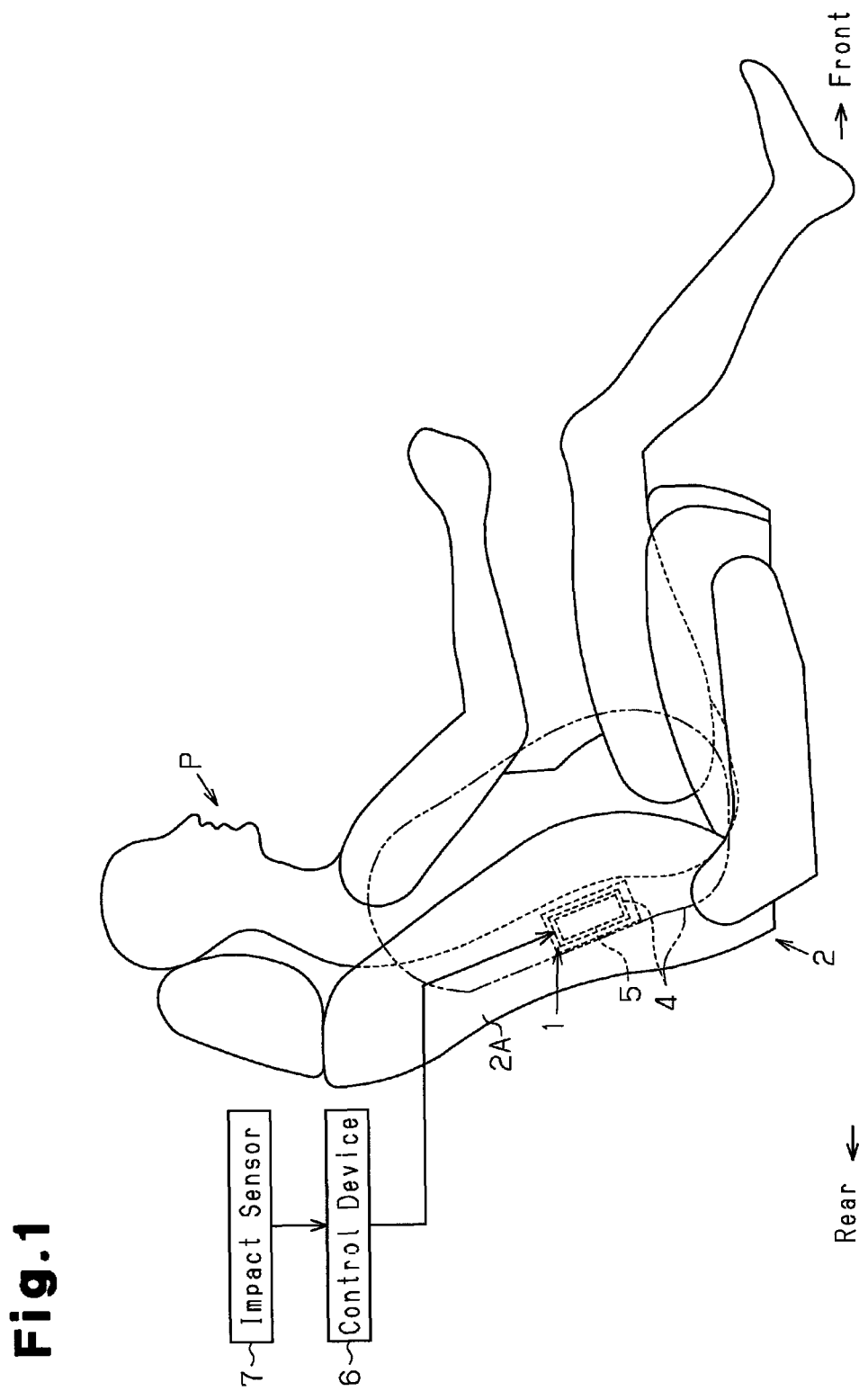
FIG. 1 is a side view illustrating a vehicle seat on which an airbag apparatus of the present invention is applied, together with an occupant and an airbag.

As shown in FIG. 1, the airbag apparatus 1 includes an airbag 4, which is provided in a folded state in a backrest 2A of a seat 2 on which an occupant P is seated in the vehicle, an inflator 5 for supplying inflation gas to the airbag 4, and a control device 6, which controls supply of gas to the airbag 4 through the inflator 5. An impact sensor 7, which includes an acceleration sensor provided on a vehicle body side portion, is connected to the control device 6. The impact sensor 7 detects an impact applied to the body side portion of the vehicle. The control device 6 controls to supply gas to the airbag 4 by activating the inflator 5 upon receipt of a detection signal from the impact sensor 7.

As shown in FIG. 2, the airbag 4 is accommodated in a part inside the backrest 2A close to the body side portion 8 of the vehicle in a folded state. The inflator 5 for supplying the inflation gas to the airbag 4 is also accommodated at the same part. The inflator 5 is secured to a frame 9 of the backrest 2A together with the folded airbag 4. When the inflation gas is supplied to the airbag 4 from the inflator 5, the folded airbag 4 starts to be inflated and deployed. Accordingly, as shown in FIG. 3, the airbag 4 is projected out of the backrest 2A while leaving part of the airbag 4 in the vicinity of the inflator 5 in the backrest 2A. In this manner, the airbag 4 is inflated through supply of the inflation gas from the inflator 5.

As shown in FIGS. 4 and 5, the airbag 4 is deployed and inflated on the side of the occupant P seated in the seat 2 and between the occupant P and the body side portion 8 of the vehicle. As is apparent from FIGS. 4 and 5, the airbag 4 is deployed and inflated at a position corresponding to the lumbar region and the thorax on the side of the occupant P seated in the seat 2.

Figure 6:
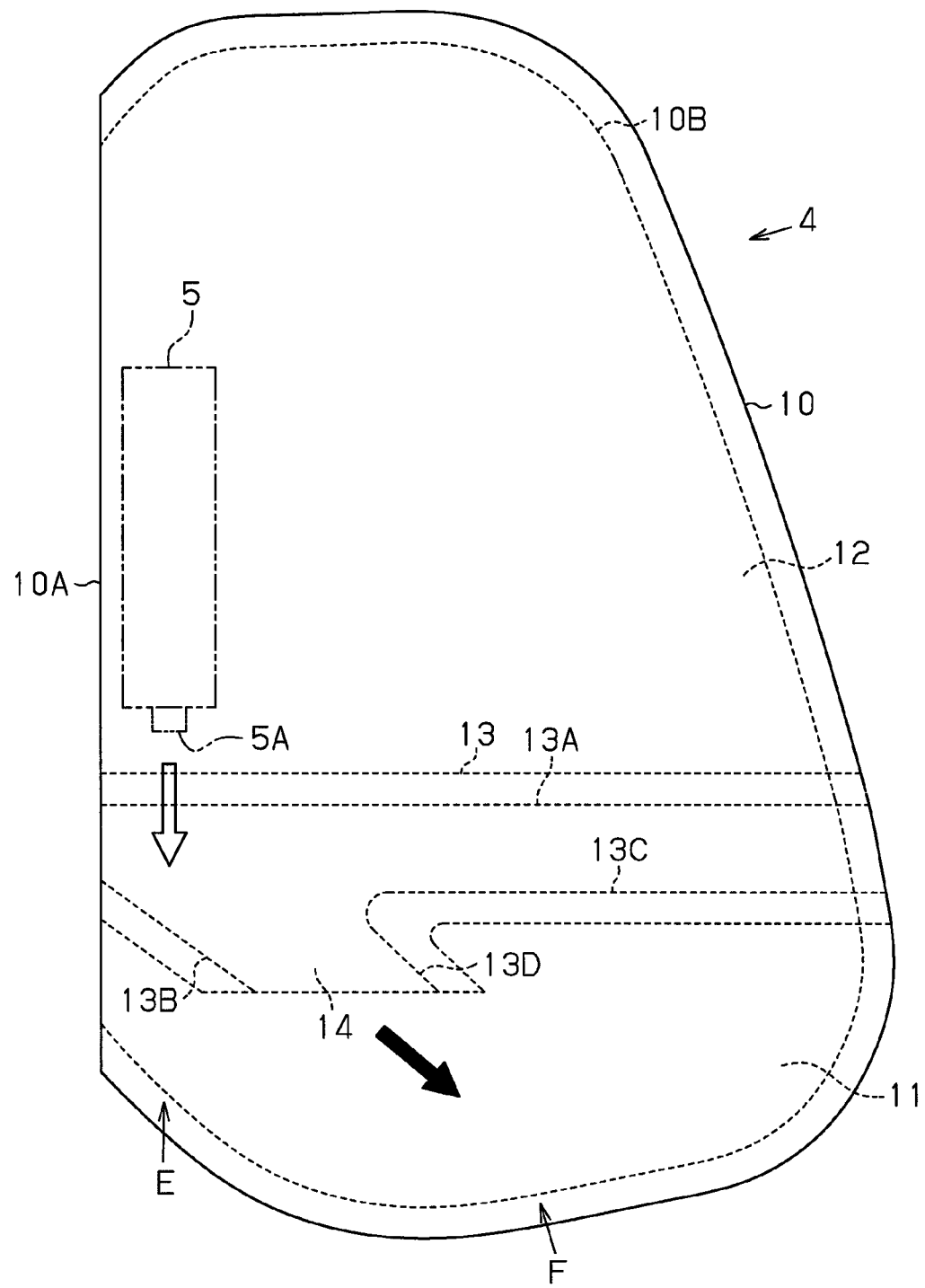
FIG. 6 is an enlarged side view illustrating the airbag.

The basic configuration of the airbag 4 will now be described. FIG. 6 shows the side configuration of the airbag 4 before being deployed and inflated, and FIG. 7 shows the planar configuration of a base fabric sheet 10 forming the airbag 4.

Figure 7:
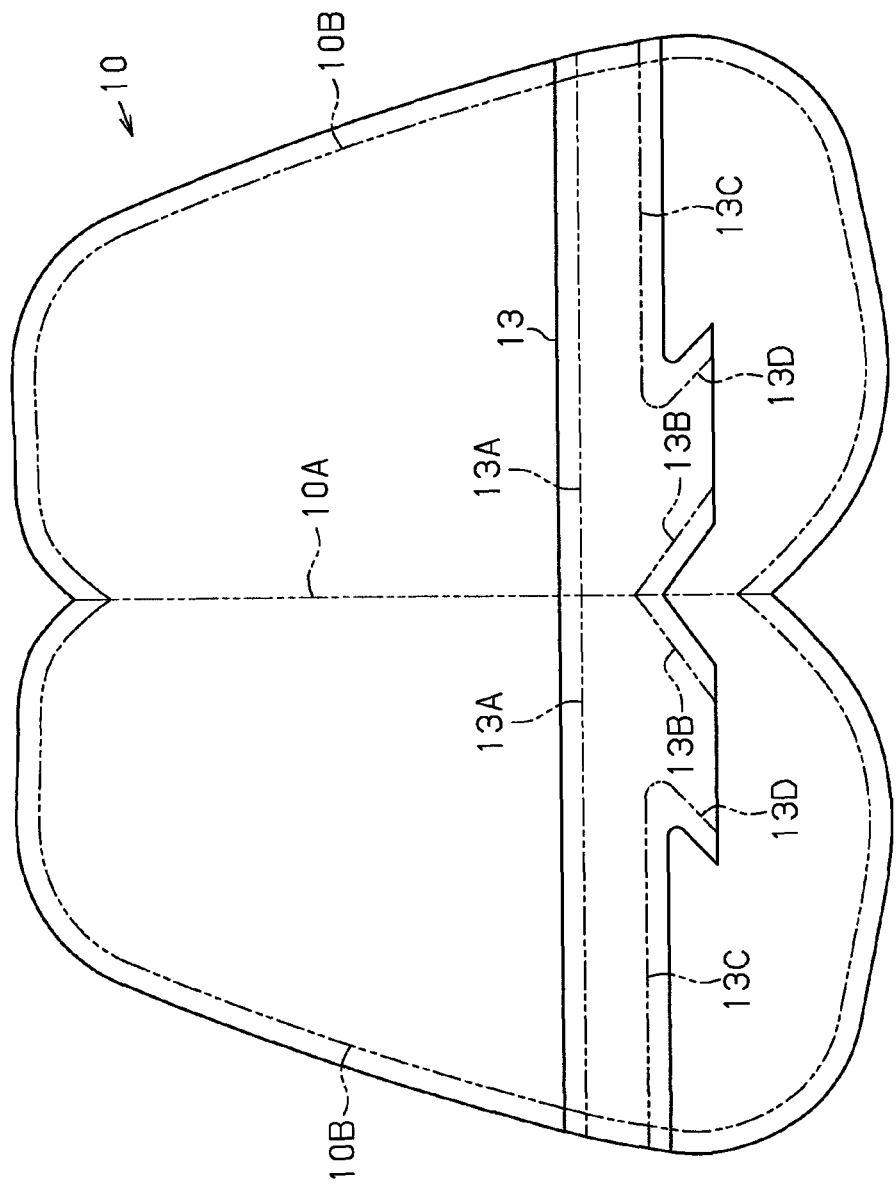
FIG. 7 is a plan view illustrating a base fabric sheet and a sheet, which form the airbag.

As shown in FIGS. 6 and 7, the airbag 4 is formed into a bag shape by folding one piece of base fabric sheet 10 along a folding line 10A in half such that the peripheral portions of the base fabric sheet 10 overlaps each other in the thickness direction, and then sewing and bonding the peripheral portions along a seam 10B. In the present embodiment, a woven fabric formed of material having high strength and flexibility (for example, polyester yarn or polyamide yarn) is used as the base fabric sheet 10.

A sheet 13 is provided inside the airbag 4. The sheet 13 divides the airbag 4 into a high pressure expansion chamber (first expansion chamber) 11 used for protecting the lumbar region of the occupant P (see FIG. 1) and a low pressure expansion chamber (second expansion chamber) 12 used for protecting the thorax of the occupant P. In the present embodiment, a woven fabric of the same material as the base fabric sheet 10 is used as the sheet 13.

In a state in which one piece of woven fabric is folded in half along the folding line 10A of the base fabric sheet 10 and overlapped in the thickness direction, the sheet 13 extends from the folding line 10A of the base fabric sheet 10 to the end opposing the folding line 10A (right end in FIG. 6). The edges of the sheet 13 close to the low pressure expansion chamber 12 (upper section in FIGS. 6 and 7) are not sewn to each other, but are sewn to the base fabric sheet 10 along a seam 13A.

The edges of the sheet 13 close to the high pressure expansion chamber 11 (lower section in FIGS. 6 and 7) are not sewn to the base fabric sheet 10 except a certain part, and most parts are sewn to each other (more specifically, seams 13B, 13C, 13D). Among the parts where the edges of the sheet 13 close to the high pressure expansion chamber 11 are sewn to each other, the seam 13B extends straight from a position close to the low pressure expansion chamber 12 toward the inside of the high pressure expansion chamber 11 starting at the folding line 10A of the base fabric sheet 10. The seam 13C extends in a direction substantially perpendicular to the folding line 10A starting from the end of the base fabric sheet 10 opposing the folding line 10A (right end in FIG. 6). The seam 13D extends continuously from the end of the seam 13C close to the folding line 10A (left end in FIG. 6), and in parallel to the seam 13B with a gap in between.

FIG. 7 is a plan view illustrating a state in which the seam 10B of the base fabric sheet 10 of the airbag 4 shown in FIG. 6 is undone, and the seams 13B, 13C, 13D of the sheet 13 are undone, so that the base fabric sheet 10 and the sheet 13 are opened with the folding line 10A at the center.

As shown in FIG. 7, the edge of the sheet 13 close to the low pressure expansion chamber 12 (upper section in FIG. 7) is sewn to the base fabric sheet 10 along the seam 13A. The base fabric sheet 10 and the sheet 13 that are sewn together are folded in half along the folding line 10A, so that two left and right folded pieces overlap each other in the thickness direction of the base fabric sheet 10. At this time, the seams 10B of the folded pieces of the base fabric sheet 10 are overlapped with each other, and the seams 13B, 13C, 13D of the sheet 13 of the folded pieces are overlapped with each other. Then, the overlapped sheet 13 is sewn along the seams 13B, 13C, 13D, and the overlapped base fabric sheet 10 is sewn along the seam 10B.

The airbag 4 is formed by sewing the base fabric sheet 10 and the sheet 13 in this manner.

As shown in FIGS. 6 and 7, the edge of the sheet 13 close to the low pressure expansion chamber 12 is joined to the base fabric sheet 10 at the seam 13A and the edges of the sheet 13 close to the high pressure expansion chamber 11 are joined to each other at the seam 13C. Thus, part of the sheet 13 where the seam 13C is formed functions as a partition wall that partitions inside of the airbag 4 into the high pressure expansion chamber 11 and the low pressure expansion chamber 12.

Also, at part of the sheet 13 where the seams 13B, 13D are formed, the two seams 13B, 13D, which extend substantially in parallel to each other, are formed on the sheet 13 that is overlapped in the thickness direction. Thus, the portion where the seams are formed functions as a communication passage 14, which connects the high pressure expansion chamber 11 and the low pressure expansion chamber 12. The communication passage 14 becomes cylindrical by the inflation gas flowing into the communication passage 14 when the airbag 4 is deployed and inflated, and permits the inflation gas to pass through. The communication passage 14 is formed on the sheet 13 in the vicinity of the folding line 10A.

As shown in FIG. 6, the inflator 5 is located in the vicinity of the folding line 10A inside the low pressure expansion chamber 12, in other words, in the vicinity of the communication passage 14. The inflator 5 is mounted such that the discharge direction of the inflation gas from a gas supply port 5A is oriented to the inside of a communication port that connects the high pressure expansion chamber 11 and the low pressure expansion chamber 12 (in the present embodiment, the opening of the communication passage 14 close to the low pressure expansion chamber 12).

Since the inflator 5 is arranged as described above, flow of the inflation gas that flows from the low pressure expansion chamber 12 toward the high pressure expansion chamber 11 is generated inside the communication passage 14 by the inflation gas discharged from the inflator 5. Thus, the inflation gas discharged from the inflator 5 is preferentially supplied to the high pressure expansion chamber 11. Some of the inflation gas discharged from the inflator 5 is also supplied to the low pressure expansion chamber 12. In the present embodiment, since the inflation gas is supplied to the inside of the airbag 4 as described above, the internal pressure of the high pressure expansion chamber 11 is high and the internal pressure of the low pressure expansion chamber 12 is low.

The apparatus of the present embodiment is configured such that, when the airbag 4 is deployed and inflated, opposing parts of the sheet 13 forming the communication passage 14 (the part where the seam 13B is formed and the part where the seam 13D is formed) approach each other as the high pressure expansion chamber 11 is sufficiently inflated. Since the cross-sectional area of the communication passage 14 is reduced at this time, the communication passage 14 functions as a check valve that limits the amount of inflation gas flowing out of the high pressure expansion chamber 11 to the low pressure expansion chamber 12. Thus, the internal pressure of the high pressure expansion chamber 11 is maintained to high pressure while supplying the inflation gas to the low pressure expansion chamber 12

The opposing parts of the sheet 13, which form the communication passage 14, approach each other in the following manner. The length of the airbag 4 is reduced in the vehicle fore-and-aft direction (left and right direction in FIG. 6) by the amount corresponding to the part of the base fabric sheet 10 that curves during inflation. The length of the part of the airbag 4 where the inside is divided by the sheet 13 into the high pressure expansion chamber 11 and the low pressure expansion chamber 12 (more specifically, the part where the seam 13C is formed) is unlikely to be reduced in the vehicle fore-and-aft direction since the sheet 13 serves as the partition wall that divides the expansion chambers 11, 12 and deploys in the vehicle fore-and-aft direction while supporting the base fabric sheet 10. In contrast, the length of the part of the airbag 4 where the inside is not divided by the sheet 13 into the high pressure expansion chamber 11 and the low pressure expansion chamber 12, that is, the length of the part where the communication passage 14 is formed is likely to be reduced in the vehicle fore-and-aft direction since the partition wall that partitions the expansion chambers 11, 12 is not formed. Thus, during inflation of the airbag 4 (more specifically, the high pressure expansion chamber 11), the airbag 4 is deformed such that the length of mainly the part where the communication passage 14 is formed is reduced in the vehicle fore-and-aft direction. Then, the opposing parts of the sheet 13 forming the communication passage 14 approach each other at this time.

According to the apparatus of the present embodiment, since the internal pressure acts to separate the joint portion of the base fabric sheet 10 (sewn portion of the seam 10B) when the airbag 4 is deployed and inflated, the joint portion of the base fabric sheet 10 is required to have high bonding strength. Also, in the apparatus of the present embodiment, when the airbag 4 is deployed and inflated, the inflation gas is discharged into the airbag 4 from the gas supply port 5A of the inflator 5. Since the inflation gas has high-temperature and high-pressure, when the inflation gas reaches and is sprayed to the periphery of the base fabric sheet 10, that is, the joint portion, great stress might be generated at this portion. Generation of great stress at the joint portion of the base fabric sheet 10 in this manner is not preferable in improving the reliability of the airbag 4.

In the apparatus of the present embodiment, discharge direction of the inflation gas from the gas supply port 5A of the inflator 5 (direction shown by open arrow in FIG. 6) is oriented to the inside of the communication passage 14, and is further oriented to the joint portion arranged at the extension of the straight line that connects the gas supply port 5A and the inside of the communication passage 14 (part shown by arrow E in the drawing). Thus, there is a concern that great stress may be generated at the joint portion of the base fabric sheet 10 due to spraying of the inflation gas to the joint portion.

With this being the case, in the apparatus of the present embodiment, the communication passage 14 extends across a space between the joint portion formed on the periphery of the base fabric sheet 10 (more specifically, the seam 10B) and the gas supply port 5A of the inflator 5 when the airbag 4 is deployed and inflated. In the present embodiment, the end of the communication passage 14 close to the low pressure expansion chamber 12 functions as the communication port, which connects the low pressure expansion chamber 12 and the high pressure expansion chamber 11. The communication passage 14 is formed to extend from the communication port, which serves as a starting point, toward the inside of the high pressure expansion chamber 11.

As the operation of the airbag apparatus according to the present embodiment, the flow manner of the inflation gas during inflation of the high pressure expansion chamber 11 will now be described.

In the apparatus of the present embodiment, when the airbag 4 is deployed and inflated, the inner wall of the communication passage 14 is located between the gas supply port 5A of the inflator 5 and the joint portion of the base fabric sheet 10 (more specifically, the part where the seam 10B is formed). Thus, the flow of the inflation gas that is discharged from the gas supply port 5A and flowed into the communication passage 14 collides with the inner wall of the communication passage 14. The energy of the flow of the inflation gas is reduced due to the collision. Thus, the inflation gas that is discharged from the gas supply port 5A flows to the inside of the high pressure expansion chamber 11 after the energy of the flow is reduced.

Thus, although the inflation gas that has flowed into the high pressure expansion chamber 11 is sprayed to the joint portion of the base fabric sheet 10, the energy of the flow of the inflation gas is kept small as compared to the apparatus of a comparative example in which the flow of the inflation gas is sprayed to the joint portion of the base fabric sheet without being interrupted by the communication passage. Thus, the stress generated at the joint portion of the base fabric sheet 10 when the airbag 4 is deployed and inflated is reduced.

In the airbag, the higher the internal pressure is, the greater the required bonding strength at the joint portion of the base fabric sheet becomes. Thus, the stress generated at the joint portion tends to become an issue. Since the apparatus of the present embodiment is configured such that the inflation gas flows toward the inside of the high pressure expansion chamber 11, the internal pressure of which is higher as compared to the low pressure expansion chamber 12, generation of the stress is likely to become an issue. In this respect, according to the present embodiment, the stress generated at the joint portion of the base fabric sheet 10 is kept small inside the high pressure expansion chamber 11 the internal pressure of which is high in the airbag 4.

According to the apparatus of the present embodiment, the portion that functions as the partition wall, which partitions between the high pressure expansion chamber 11 and the low pressure expansion chamber 12, and the communication passage 14, which connects the high pressure expansion chamber 11 and the low pressure expansion chamber 12, are integrally formed with the sheet 13. Thus, the structure of the airbag 4 is simplified, and the airbag 4 is easily manufactured as compared to the apparatus of the comparative example, in which the portion that functions as the partition wall and the communication passage 14 are separately formed.

In the apparatus of the present embodiment, since the inflation gas that is discharged from the gas supply port 5A of the inflator 5 is sprayed to the part of the communication passage 14 where the seam 13B is formed, there is a concern that stress is generated at the seam 13B. In this respect, since the communication passage 14 is configured to deflect the flow when the inflation gas flows through the communication passage 14 and is not configured to stop the flow of the inflation gas, the stress is not so great although the stress is generated at the joint portion on which the inflation gas is sprayed.

In the apparatus of the present embodiment, the flow of the inflation gas that is deflected by collision with the inner wall of the communication passage 14 (shown by solid arrow in FIG. 6) is sprayed to part of the periphery of the base fabric sheet 10 where the curvature is the smallest in the extending direction of the joint portion (more specifically, the part where the seam 10B extends straight: the part shown by arrow F in the drawing).

At the inside of the high pressure expansion chamber 11, the greater the curvature in the extending direction of the joint portion of the base fabric sheet 10 is (more specifically, the curvature in the direction that becomes a concavity as viewed from the inside of the high pressure expansion chamber 11), the more the flow of the inflation gas is likely to concentrate, and the greater the stress caused due to spraying of the inflation gas is likely to become. Thus, it is preferable to employ a structure in which the inflation gas is sprayed to a region where the curvature of the joint portion of the base fabric sheet 10 in the extending direction is small to reduce the stress caused due to spraying of the inflation gas.

In this respect, according to the present embodiment, regions having different curvatures such as the region E and the region F are provided. Among these, the inflation gas that flows into the high pressure expansion chamber 11 from the communication passage 14 is sprayed to the region F having the smallest curvature, that is, the region F, where the stress generated due to spraying of the inflation gas is kept small. Thus, the stress generated at the joint portion of the base fabric sheet 10 is reduced in a suitable manner.

The present embodiment described above has the following advantages.

(1) The communication passage 14 extends across the space between the joint portion, which is formed on the periphery of the base fabric sheet 10, and the gas supply port 5A of the inflator 5 when the airbag 4 is deployed and inflated. Thus, the energy of the flow of the inflation gas is kept small as compared to the apparatus of the comparative example in which the flow of the inflation gas is sprayed to the joint portion of the base fabric sheet without being interrupted by the communication passage. Thus, the stress generated at the joint portion of the base fabric sheet 10 when the airbag 4 is deployed and inflated is reduced.

(2) The stress caused at the joint portion of the base fabric sheet 10 is kept small inside the high pressure expansion chamber 11 in which the internal pressure is high among parts of the airbag 4.

(3) The portion that functions as the partition wall, which partitions between the high pressure expansion chamber 11 and the low pressure expansion chamber 12, and the communication passage 14, which connects the high pressure expansion chamber 11 and the low pressure expansion chamber 12, are integrally formed with the sheet 13. Thus, the structure of the airbag 4 is simplified, and the airbag 4 is easily manufactured as compared to the apparatus of the comparative example in which the portion that functions as the partition wall and the communication passage are separately formed.

(4) The communication passage 14 is formed such that the flow of the inflation gas that is deflected by collision with the inner wall of the communication passage 14 is sprayed to the region where the curvature of the joint portion of the base fabric sheet 10 in the extending direction is the smallest. Thus, the stress generated at the joint portion of the base fabric sheet 10 is reduced in a suitable manner.

The above described embodiment may be modified as follows.

The inflator 5 may be provided outside the airbag 4, and gas discharged by the inflator 5 may be supplied to the inside of the airbag 4 via, for example, a tube. In this case, a gas supply port, which discharges the inflation gas in the airbag 4, may be arranged inside the low pressure expansion chamber 12 such that the inflation gas is discharged to the inside of the communication passage 14.

Instead of providing the communication passage 14 (more specifically, the seams 13B, 13D at which the sheet 13 is sewn together) to extend straight, the communication passage 14 may extend to be slightly curved.

The base fabric sheet 10 for forming the airbag 4 does not necessarily have to be folded in half along the folding line 10A and overlapped in the thickness direction. For example, two base fabric sheets may be overlapped in the thickness direction and the peripheries may be sewn to each other to form the airbag.

The sheet 13 does not necessarily have to be folded in half along the folding line 10A and overlapped in the thickness direction. For example, one sheet that is folded in half along the position corresponding to the seam 13B and overlapped in the thickness direction, or two sheets that are overlapped in the thickness direction may be employed instead of the sheet 13.

The apparatus of the above-described embodiment may be applied to an apparatus in which the communication passage 14 does not function as the check valve, but functions only as the passage that connects the high pressure expansion chamber 11 and the low pressure expansion chamber 12.

The flow of the inflation gas that flows into the high pressure expansion chamber 11 from the inside of the communication passage 14 may be sprayed to a region other than the region where the curvature of the joint portion at the periphery of the base fabric sheet 10 (more specifically, the seam 10B) in the extending direction is the smallest.

The portion that functions as the partition wall, which partitions between the high pressure expansion chamber 11 and the low pressure expansion chamber 12, and the communication passage 14, which connects the high pressure expansion chamber 11 and the low pressure expansion chamber 12, may be separately formed.

Figure 8:
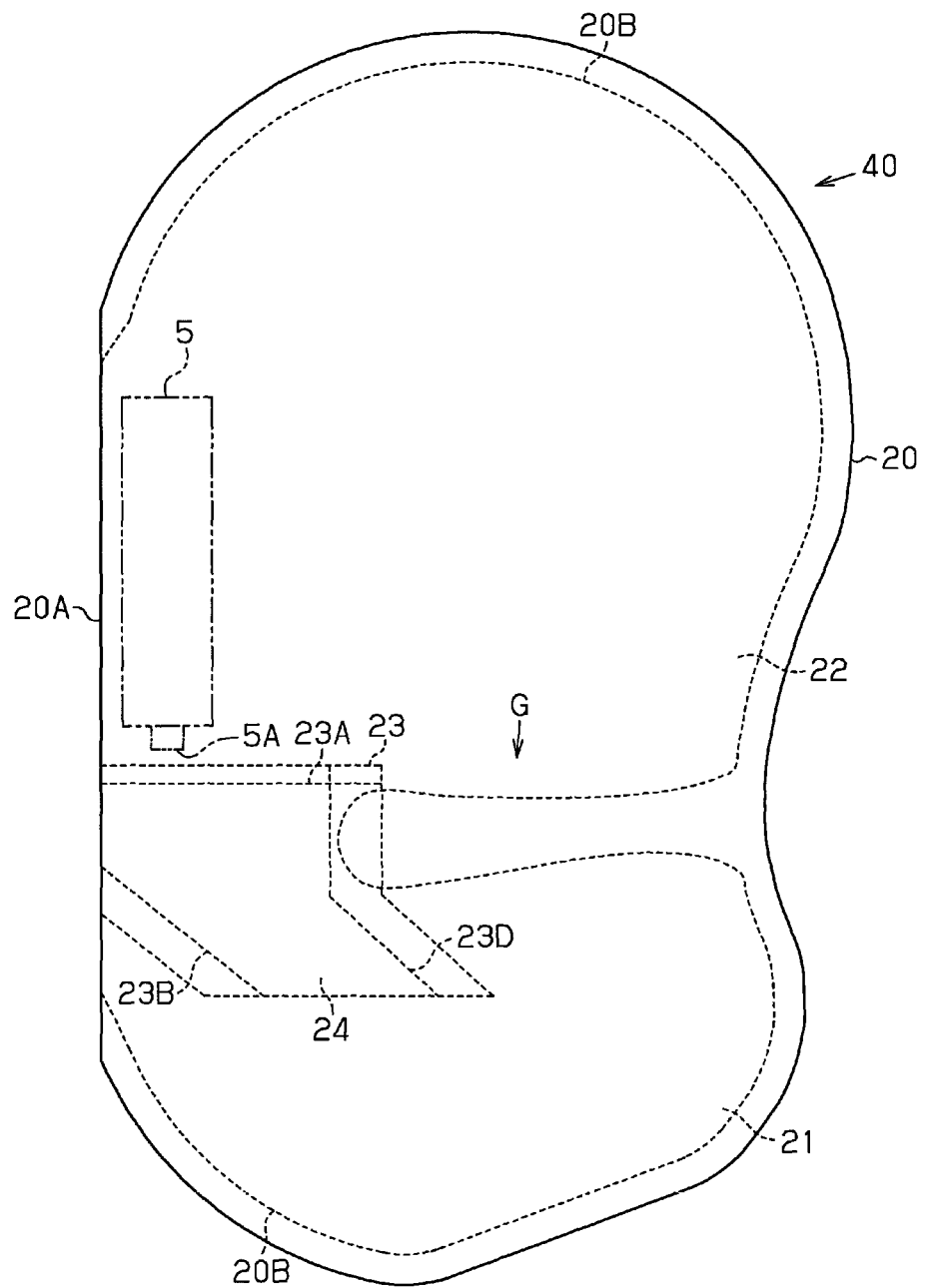
FIG. 8 is a side view illustrating another example of the airbag.

As shown in FIG. 8, part of a seam 20B where the peripheries of a folded base fabric sheet 20 are sewn to each other (the part shown by arrow G in FIG. 8) may extend from the vicinity of the periphery of the base fabric sheet 20 to the vicinity of a folding line 20A, to function as a partition wall, which partitions the inside of an airbag 40 into a high pressure expansion chamber 21 and a low pressure expansion chamber 22. In the example shown in FIG. 8, a sheet 23, which is folded in half along the folding line 20A of the base fabric sheet 20 and overlapped in the thickness direction, is provided to form a communication passage 24 inside the airbag 40. The edges of the sheet 23 close to the low pressure expansion chamber 22 are not sewn to each other, but are sewn to the base fabric sheet 20 along a seam 23A. Also, parts of the sheet 23 are not sewn to the base fabric sheet 20, but are sewn to each other (more specifically, seams 23B, 23D). The seam 23B extends straight from the position close to the low pressure expansion chamber 22 toward the inside of the high pressure expansion chamber 21 with the folding line 20A of the base fabric sheet 20 serving as a starting point. The part of the seam 23D close to the high pressure expansion chamber 21 extends substantially parallel to the seam 23B with a space in between. The part of the seam 23D close to the low pressure expansion chamber 22 extends parallel to the folding line 20A of the base fabric sheet 20. In the example shown in FIG. 8, part of the sheet 23 where the seams 23B, 23D are formed functions as the communication passage 24, which connects the high pressure expansion chamber 21 and the low pressure expansion chamber 22.

The base fabric sheets 10, 20 and the sheets 13, 23 do not necessarily have to be joined by sewing together, but may be joined together by other method such as using an adhesive.

The present invention does not necessarily have to be applied to the airbag apparatus that deploys and inflates the airbag on the side of the occupant, but may be applied to the airbag apparatus that inflates the airbag at the lower front of the legs of the occupant to protect the knees of the occupant.

The invention claimed is:

1. An airbag apparatus comprising:
  an airbag having a first expansion chamber, and a second expansion chamber, wherein the airbag has a joint portion where an outer periphery of a base fabric sheet is joined;

a communication port for connecting the first expansion chamber and the second expansion chamber to each other in the airbag, wherein the communication port has an edge;

a gas supply port arranged inside the second expansion chamber and configured to discharge inflation gas toward an inside of the communication port, wherein the gas supply port supplies the inflation gas to an inside of the airbag; and a communication passage extending from the edge of the communication port, serving as a starting point, toward an inside of the first expansion chamber, and the communication passage having an inner wall. Wherein, at deployment and inflation of the airbag, the communication passage extends across a space between the joint portion of the airbag, and the gas supply port, and the inflation gas discharges from the as supply port and flows into the communication Passage; and when initially inflating and deploying, the inflation gas collides with the inner wall of the communication passage.

2. The airbag apparatus according to claim 1, wherein at deployment and inflation of the airbag, the airbag apparatus preferentially supplies the inflation gas to the first expansion chamber, and the communication passage is formed by a sheet that deforms to he cylindrical when the first expansion chamber is deployed and inflated, and at completion of deployment and inflation of the first expansion chamber, the opposing portions of the sheet approach each other such that the communication passage functions as a check valve that limits the amount of inflation gas flowing out from the first expansion chamber to the second expansion chamber.

3. The airbag apparatus according to claim 1 wherein the airbag includes a partition wall formed by a sheet joined to the base fabric sheet, wherein the partition wall defines the first expansion chamber and the second expansion chamber, and the communication passage is formed by the base fabric sheet and the partition wall.

4. The airbag apparatus according to claim 1, wherein the joint portion of the airbag extends along the outer periphery of the base fabric sheet, the joint portion has a concavity as viewed from the inside of the first expansion chamber, and includes a plurality of regions having different curvatures, and the communication passage has a shape that orients the flow of the inflation gas that flows into the first expansion chamber toward the region having the smallest curvature.

5. The airbag apparatus according to claim 2, wherein the airbag includes a partition wail formed by a sheet joined to the base fabric sheet, wherein the partition wall defines the first expansion chamber and the second expansion chamber, and the communication passage is formed by the base fabric sheet and the partition wall.

6. The airbag apparatus according to claim 2, wherein the joint portion of the airbag extends along the outer periphery of the base fabric sheet, the joint portion has a concavity as viewed from the inside of the first expansion chamber and includes a plurality of regions having different curvatures, and the communication passage has a shape that orients the flow of the inflation gas that flows into the first expansion chamber toward the region having the smallest curvature.

7. The airbag apparatus according to claim 3, wherein the joint portion of the airbag extends along the outer periphery of the base fabric sheet, the joint portion has a concavity as viewed from the inside of the first expansion chamber and includes a plurality of regions having different curvatures, and the communication passage has a shape that orients the flow of the inflation gas that flows into the first expansion chamber toward the region having the smallest curvature.

8. The airbag apparatus according to claim 1, wherein the inner wall of the communication passage is located between the gas supply port and the joint portion of the base fabric sheet.

9. An airbag apparatus comprising:

a base fabric material having a joint portion joining together an outer periphery of the base fabric, a first expansion chamber and a second expansion chamber;

a communication port connecting the first expansion chamber and the second expansion chamber to each other in the airbag, the communication port having an edge;

a gas supply port arranged inside the second expansion chamber and configured to discharge inflation gas into the communication port, the gas supply port supplying the inflation gas to the airbag; and a communication passage extending from the edge of the communication port into the first expansion chamber, the communication passage having an inner wall configured to reduce energy of the inflation gas discharged from the gas supply port, wherein at initial deployment and inflation of the airbag, the communication passage extending across a space between the joint portion of the airbag and the gas supply port, the inflation gas discharging from the gas supply port and flowing into the communication passage and colliding with the inner wall of the communication thereby reducing the energy of the inflation gas.

10. The airbag apparatus according to claim 9, Wherein the inner wall of the communication passage is located between the gas supply port and the joint portion of the base fabric sheet.

* * * * *